(12) United States Patent
Hsu

(10) Patent No.: US 11,874,806 B2
(45) Date of Patent: Jan. 16, 2024

(54) FILE VERSIONING MANAGEMENT METHOD AND FILE SYSTEM

(71) Applicant: QNAP Systems, Inc., New Taipei (TW)

(72) Inventor: Chia-Hung Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 38 days.

(21) Appl. No.: 17/587,007

(22) Filed: Jan. 28, 2022

(65) Prior Publication Data
US 2023/0195699 A1 Jun. 22, 2023

(30) Foreign Application Priority Data
Dec. 16, 2021 (TW) ................... 110147212

(51) Int. Cl.
| | | |
|---|---|---|
| G06F 17/00 | (2019.01) | |
| G06F 7/00 | (2006.01) | |
| G06F 16/18 | (2019.01) | |
| G06F 16/185 | (2019.01) | |
| G06F 16/16 | (2019.01) | |

(52) U.S. Cl.
CPC ........ G06F 16/1873 (2019.01); G06F 16/162 (2019.01); G06F 16/185 (2019.01)

(58) Field of Classification Search
CPC ... G06F 16/1873; G06F 16/162; G06F 16/185
USPC ...................................................... 707/809
See application file for complete search history.

(56) References Cited

U.S. PATENT DOCUMENTS

| | | | | |
|---|---|---|---|---|
| 11,526,346 | B1 * | 12/2022 | McGarity | G06F 9/44521 |
| 2003/0046366 | A1 * | 3/2003 | Pardikar | H04L 67/563 |
| | | | | 709/219 |
| 2006/0206511 | A1 | 9/2006 | Picon et al. | |
| 2007/0083570 | A1 * | 4/2007 | Fineberg | G06F 16/1873 |
| | | | | 707/999.203 |
| 2007/0266056 | A1 * | 11/2007 | Stacey | G06F 16/185 |
| | | | | 707/999.203 |
| 2009/0024674 | A1 * | 1/2009 | Gallagher | G06F 16/1873 |
| | | | | 707/999.203 |
| 2010/0191783 | A1 * | 7/2010 | Mason | G06F 11/1464 |
| | | | | 711/E12.001 |
| 2014/0101212 | A1 * | 4/2014 | Maze | G06F 16/1873 |
| | | | | 707/827 |

(Continued)

FOREIGN PATENT DOCUMENTS

| | | |
|---|---|---|
| CN | 107526777 A | 12/2017 |
| CN | 108563701 A | 9/2018 |

(Continued)

*Primary Examiner* — Pavan Mamillapalli
(74) *Attorney, Agent, or Firm* — HAMRE, SCHUMANN, MUELLER & LARSON, P.C.

(57) ABSTRACT

A file versioning management method and a file system executing the method are provided. The method includes: writing a file into a first file path, wherein the first file path includes a first folder, generating a second file path according to the first file path, wherein the second file path includes a second folder at least one level under the first folder; and creating a link pointing from the file of the first file path to a next level of the second folder so as to generate a version information file at the next level of the second folder and make the link point to the version information file.

11 Claims, 8 Drawing Sheets

(56) References Cited

U.S. PATENT DOCUMENTS

2014/0181033 A1  6/2014  Pawar et al.

FOREIGN PATENT DOCUMENTS

| CN | 109690522 A | 4/2019 |
| CN | 110764749 A | 2/2020 |
| TW | I537750 B   | 2/2017 |
| TW | I740429 B   | 9/2021 |

* cited by examiner

FILE VERSIONING MANAGEMENT METHOD AND FILE SYSTEM

BACKGROUND

1. Technical Field

The present disclosure relates to file management technology, and more particularly, to a method for file versioning management and a file system executing the method.

2. Description of Related Art

Versioning management is a function of some file systems. Data contents of files using this function are not allowed to be directly modified. If there is any modification, the file system saves the modified data contents as a new version, which coexists with the old version in the file system for users to compare the differences between the versions. In addition, the files can be restored to their old versions when necessary.

The existing file systems that support versioning management can be roughly classified into two types. One type of the file systems supports versioning management, such as Btrfs, New Implementation of a Log-structured File System (NILFS) and Tux3. The other type of the file systems cannot support versioning management directly, which can support versioning management through a Filesystem in User Space (FUSE). However, the superimposition of a FUSE reduces performance.

For some storage devices, if it is necessary to add the versioning management technology while maintaining good file access performance, the above two approaches are not suitable because some storage devices cannot simply change their file systems, and if a FUSE is superimposed on their file systems, the FUSE significantly reduces file access performance, so a technology is needed to solve the above issue.

SUMMARY

In an aspect, the present disclosure provides a file versioning management method, comprising: writing a file into a first file path, wherein the first file path includes a first folder; generating a second file path according to the first file path, wherein the second file path includes a second folder, and the second folder is at least one level under the first folder; and creating a link pointing from the file of the first file path to a next level under the second folder to generate a version information file at the next level under the second folder and make the link point from the file to the version information file.

In another aspect, the present disclosure provides a file system applied to a storage device, a computer or a server, and configured to execute the aforementioned file versioning management method.

The present disclosure utilizes link features in some file systems in combination with the encoding and decoding of file paths to achieve the purpose of file multi-version management. Since creating a link in a file system costs very little resources in a system, the present disclosure can provide file versioning management based on the links and the encoding and decoding of file paths, and meanwhile maintains the original access performance of the file system without affecting its access performance.

BRIEF DESCRIPTION OF THE DRAWINGS

The present disclosure can be more fully understood by reading the following descriptions of the embodiments, with reference made to the accompanying drawings.

FIGS. 7-1 and 7-2 are schematic flowcharts of a file versioning management method according to another embodiment of the present disclosure.

FIGS. 8-1 and 8-2 are schematic flowcharts of a file versioning management method according to yet another embodiment of the present disclosure.

DETAILED DESCRIPTION OF THE EMBODIMENTS

The following examples are used for illustrating the present disclosure. A person skilled in the art can easily conceive the other advantages and effects of the present disclosure, based on the disclosure of the specification. The present disclosure can also be implemented or applied as described in different examples. It is possible to modify or alter the following examples for carrying out this disclosure without contravening its spirit and scope, for different aspects and applications.

It is further noted that, as used in this specification, the singular forms "a," "an," and "the" include plural referents unless expressly and unequivocally limited to one referent. The phrase "and/or" indicates that a plurality of features, elements or components are to be taken individually or some of the features, the elements or the components are to be taken together.

Figure 1:
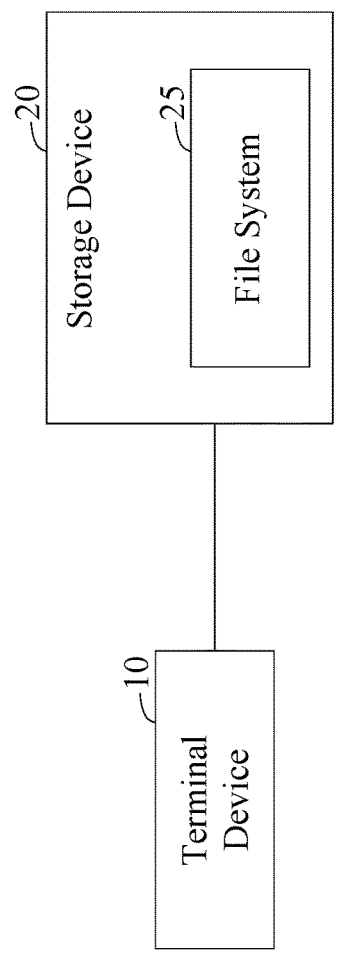
FIG. 1 is a schematic diagram of a file system according to an embodiment of the present disclosure.

Please refer to FIG. 1, which is a schematic diagram of a file system according to an embodiment of the present disclosure. As shown in FIG. 1, a file system 25 is installed in a storage device 20 for storing files uploaded by a terminal device 10.

The terminal device 10 is an electronic device of a user, such as a smart phone, a tablet computer, a notebook computer, a personal computer, a network-attached storage (NAS), a portable device or an electronic device. The storage device 20 may be a network-attached storage (NAS) or another independent data storage device. Alternatively, the storage device 20 may also be a computer or a server.

The terminal device 10 is connected to the storage device 20 via a wired or wireless network for uploading files to the storage device 20, and reading or downloading files from the storage device 20. In addition, the file system 25 may be implemented as software, hardware, and/or firmware.

The file system 25 executes the file versioning management method shown in FIGS. 2 to 8-2 according to various embodiments of the present disclosure, which is described in detail below.

Figure 2:
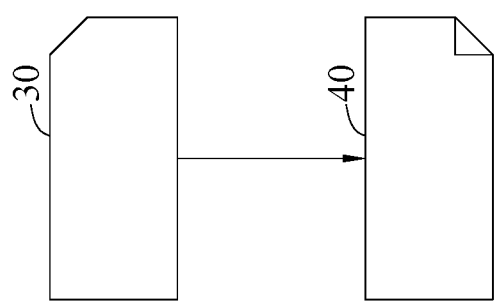

When the terminal device 10 uploads a file, such as the file 40, as shown in FIG. 2, the file system 25 of the storage device 20 receives the file 40 and writes the file 40 into the first file path, wherein the first file path includes the folder 30. For example, the folder 30 may be named "Folder" and the file 40 may be named "File1". In computing, a directory is a file system cataloging structure which contains references to other computer files, and possibly other directories. On many computers, directories are also known as folders, or drawers, analogous to a workbench or the traditional office filing cabinet.

The folder 30 may be a pre-created folder of the file system 25, and the file system 25 adopts a tree structure.

Therefore, in an embodiment, the first file path may further include other folders (not shown) over the folder 30, up to the root folder of the file system 25.

Next, the file system 25 generates the second file path according to the first file path. The first file path is the storage path of the file 40 in the file system 25 provided or known by the terminal device 10, while the second file path is a path used to store multiple versions of the file 40 in the file system 25.

Figure 3:
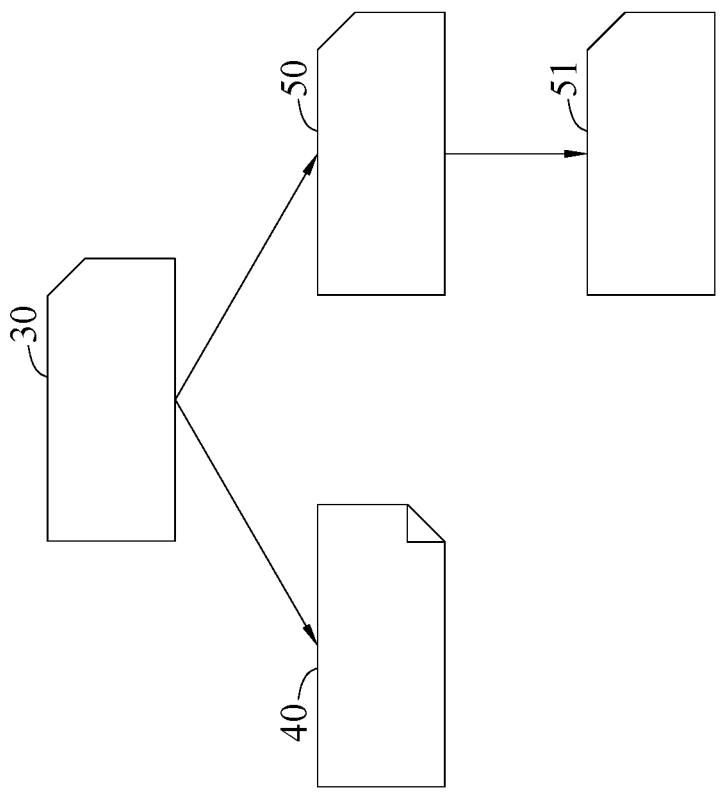
FIGS. 2 to 6 are schematic flowcharts of a file versioning management method according to an embodiment of the present disclosure.

As shown in FIG. 3, the second file path includes the folder 30, the versioning folder 50 and the folder 51. The versioning folder 50 is at least one level under the folder 30, and the folder 51 is at the next level under the versioning folder 50. In addition, in an embodiment, the second file path may further include other folders over the folder 30, up to the root folder of the file system 25. For example, the versioning folder 50 may be named "Versioning" and the folder 51 may be named ":File1".

In an embodiment, the versioning folder 50 may be a hidden folder or include a hidden folder to prevent ordinary users from directly reading or manipulating folders and version information files under the versioning folder 50.

If the file 40 is the first file uploaded file using versioning management technology, then the file system 25 creates the versioning folder 50. When the terminal device 10 uploads the file 40 for the first time, the file system 25 create the folder 51.

In an embodiment, the name of the folder 51 (:File1) is generated by encoding based on the name of the file 40 (File1) to represent the association between the folder 51 and the file 40. For example, the above encoding is attaching a preset prefix to the beginning of the file name, for example, using the character ":" as the prefix to encode the file name "File1" into the corresponding folder name ":File1" or encode the file name "File2" into the corresponding folder name ":File2".

Figures 2, 4:
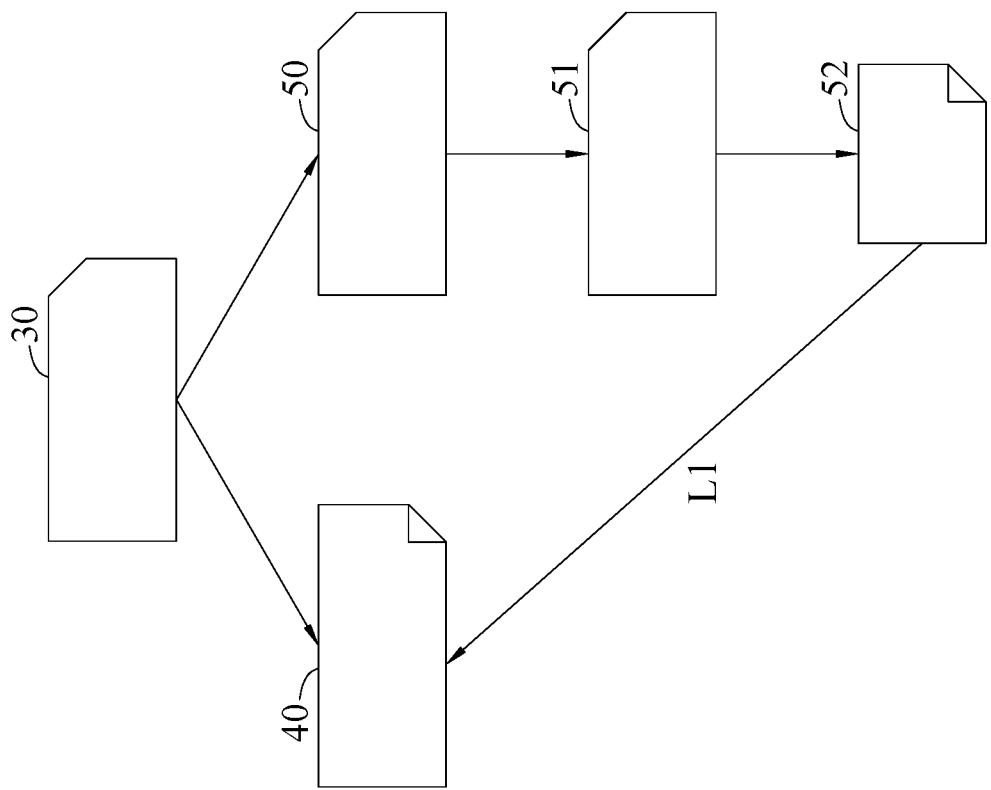
Figures 1, 4:
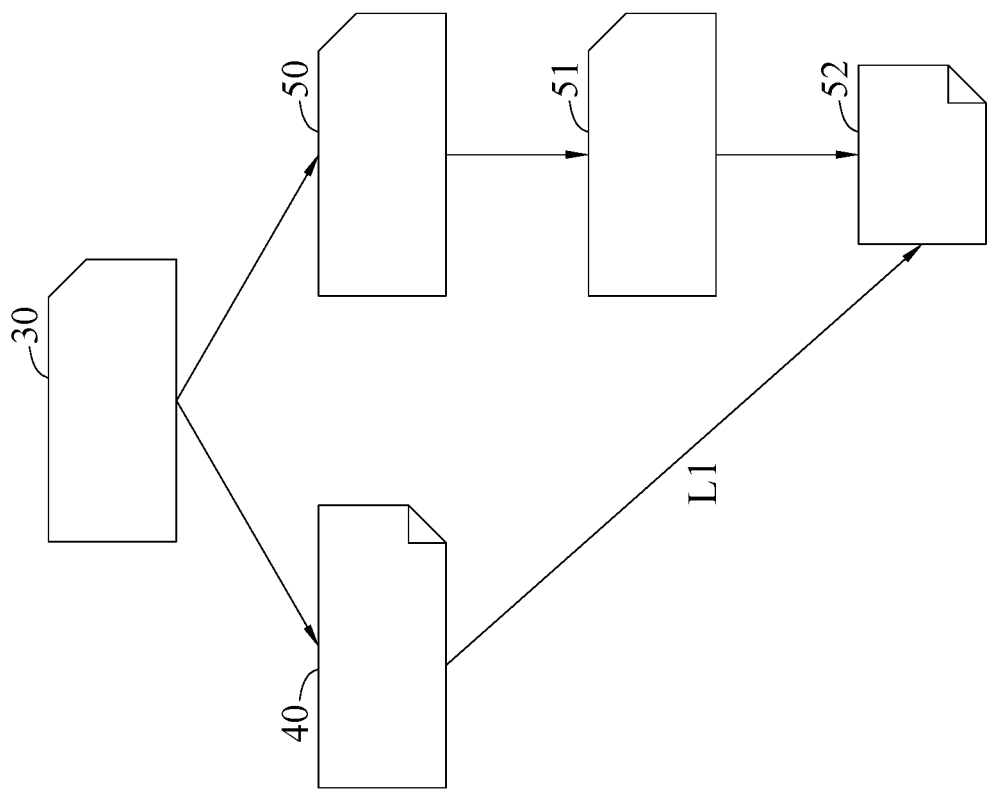

Next, as shown in FIG. 4-1, the file system 25 creates a link L1 pointing from the file 40 of the first file path to the next level under the folder 51, so as to generate the version information file 52 at the next level under the folder 51, and make the link L1 point from the file 40 of the first file path to the version information file 52.

In embodiments of the present disclosure, a link (for example, the link L1) may be a hard link or a symbolic link, for example, a hard link or a symbolic link supported by the ZFS file system or the ext4 file system, wherein a hard link can make the file 40 and version information file 52 share an index node (inode). Therefore, in a hard link environment, the file 40 and the version information file 52 actually access the same inode, and therefore both have the same metadata and data contents. Hence, when the user or the terminal device 10 reads the file 40 of the first file path from the storage device 20, the user or the terminal device 10 reads the same inode of the version information file 52.

In another embodiment, a symbolic link can make the file 40 and the version information file 52 not share an inode. Therefore, in a symbolic link environment, when the user or the terminal device 10 reads the file 40 of the first file path from the storage device 20, the file system 25 reads the version information file 52 instead according to the symbolic link. Actually, the read target of the user or the terminal device is changed from file 40 (inode A) to the version information file 52 (inode B).

In an embodiment, the aforementioned metadata includes, for example, file size, file type, creation time, attributes such as whether a file is read-only and/or whether a file is hidden, and extended attributes.

In order to achieve the immutable characteristics required for versioning management, the file system 25 may use a symbolic link, such as the symbolic link L1 in FIG. 4-2, to set an object lock for the file 40. In an embodiment, the write-once-read-many (WORM) function supported by the ZFS file system under the QuTS Hero architecture, which is a QNAP software product, to write the settings of the object lock into the version information file 52, to set the version information file 52 to an immutable state.

In another embodiment, setting the immutable flag in the attributes of the version information file 52 may set the file 40 and the version information file 52 to the immutable state. In addition, since the WORM function and the immutable flag both use inodes as operation targets, the symbolic link is required as the link L1 in the implementation of the object lock.

Figure 5:
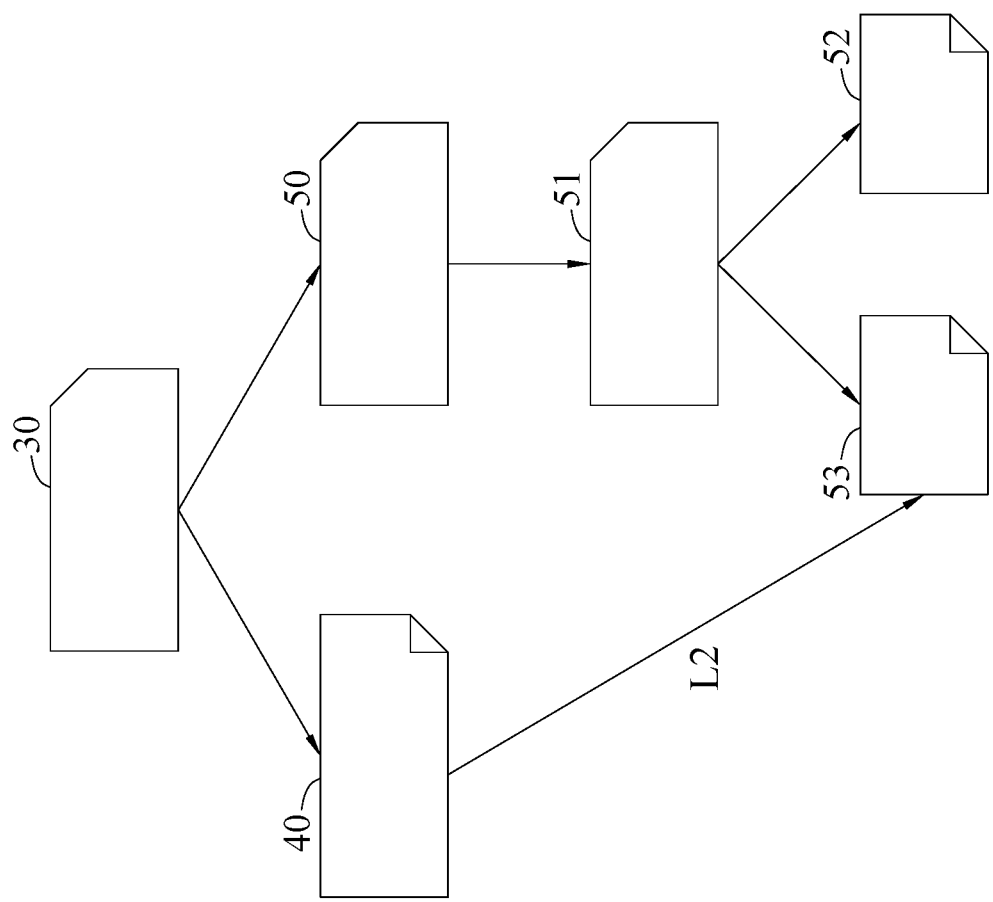

When the terminal device 10 uploads the file 40 again, as shown in FIG. 5, the file system 25 of the storage device 20 receives the file 40 and writes the file 40 into the first temporary file T1 (not shown), then moves the first temporary file T1 to overwrite the file 40 of the first file path. Next, the file system 25 creates a link L2 pointing from the file 40 of the first file path to the next level under the folder 51 to generate a version information file 53 at the next level under the folder 51, and make the link L2 point from the file 40 of the first file path to the version information file 53.

Figure 6:
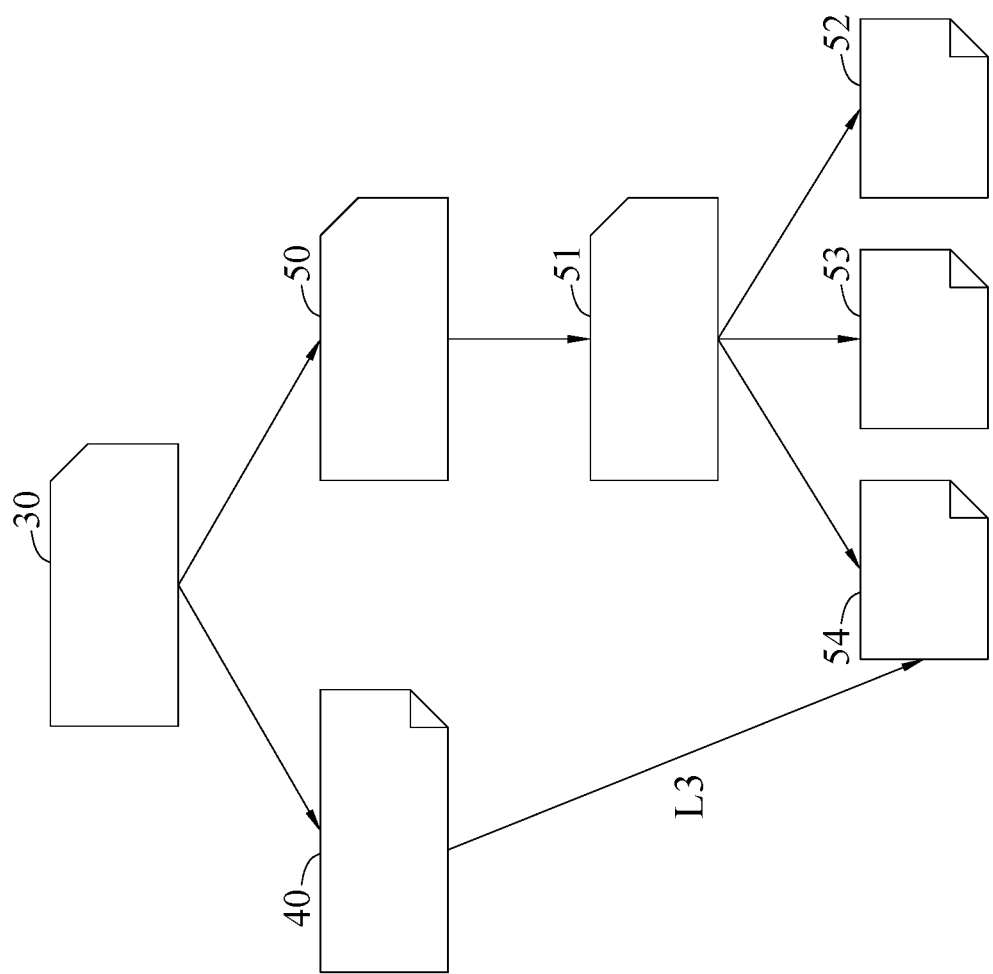

When the terminal device 10 uploads the file 40 for the third time, as shown in FIG. 6, the file system 25 of the storage device 20 receives the file 40 and writes the file 40 into the second temporary file T2 (not shown), then moves the second temporary file T2 to overwrite the file 40 of the first file path. Next, the file system 25 creates a link L3 pointing from the file 40 of the first file path to the next level under the folder 51 to generate a version information file 54 at the next level under the folder 51, and make the link L3 point from the file 40 of the first file path to the version information file 54. For example, the version information files 52-54 may be respectively named "V1", "V2" and "V3".

The file system 25 stores multiple different versions of the file 40 under the folder 51 of the second file path, thereby achieving the technology of multiple versions of the file. Like the aforementioned link L1, due to the link L3, the file 40 and the version information file 54 are actually the same file, and both have common metadata and data contents. Therefore, when the terminal device 10 reads the file 40 of the first file path from the storage device 20, it reads the latest version 54.

In addition, if it is necessary to read a previous version, the terminal device 10 may send a read request for a specified version to the storage device 20. Then, the file system 25 may directly read and return any version information file under the folder 51.

The names of the folders and the files (i.e., Folder, Versioning, :File1, File1, V1, V2, V3) in FIGS. 2 to 6 are just examples. In different embodiments, the folders and the files may have different names. For example, in an embodiment, the names of the version information files V1 to V3 may be changed to their respective Universally Unique Identifiers (UUID).

In another embodiment, the file system 25 may further store multiple versions of other files. For example, if the terminal device 10 uploads another file (FileX), in a similar manner as that for receiving the file 40 (File1) mentioned above, the file system 25 writes the file (FileX) into the next level under the folder 30, creates a corresponding folder (:FileX) at the next level under the versioning folder 50, generates multiple version information files of the file at the next level under the folder, and creates a link pointing from the file under the folder 30 to the latest version information file of the file.

Figures 2, 7:
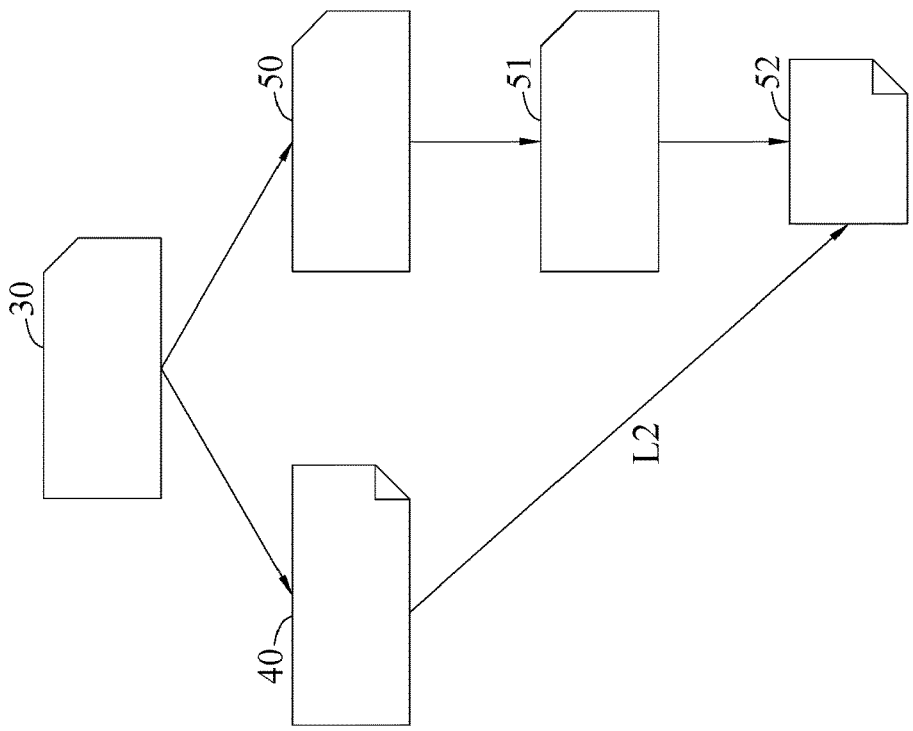
Figures 1, 7:
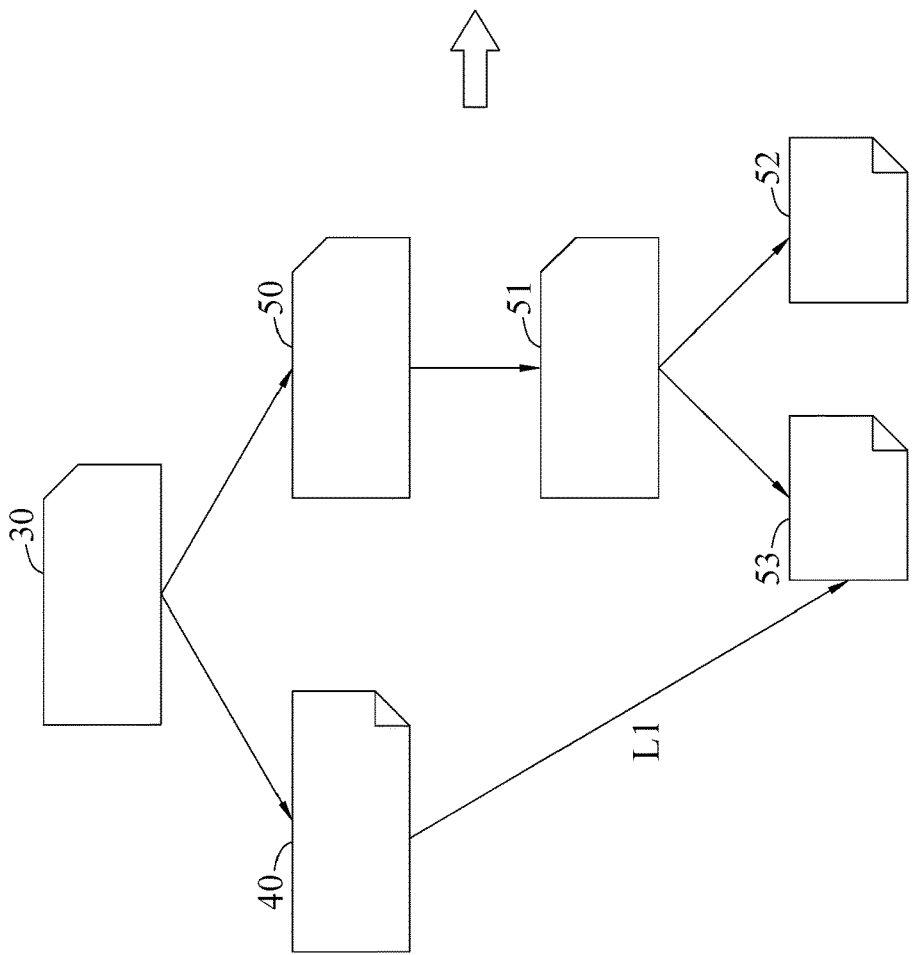

Next, please refer to FIGS. 7-1 and 7-2. First, as shown in FIG. 7-1, the file 40 has two versions 52 and 53, and the link L1 points from the file 40 of the first file path to the latest version 53. Therefore, when the terminal device 10 reads the file 40 of the first file path from the storage device 20, the version 53 is read.

When the terminal device 10 sends a request for deleting the version 53 of the file 40 to the storage device 20, as shown in FIG. 7-2, the file system 25 deletes the version information file 53 in response to the request, and creates a link L2 pointing from the file 40 of the first file path to the version information file 52. After that, when the terminal device 10 reads the file 40 of the first file path from the storage device 20, the version 52 is read.

In another embodiment, when the file 40 has three or more versions, and when the terminal device 10 sends a request for deleting the latest version of the file 40 to the storage device 20, in response to the request, the file system 25 deletes the version information file referred to by the link of the file 40. Next, among the remaining version information files under the folder 51, the file system 25 sets the version information file with the latest creation time as the latest version, and then creates a link pointing from the file 40 of the first file path to the latest version.

Figures 2, 8:
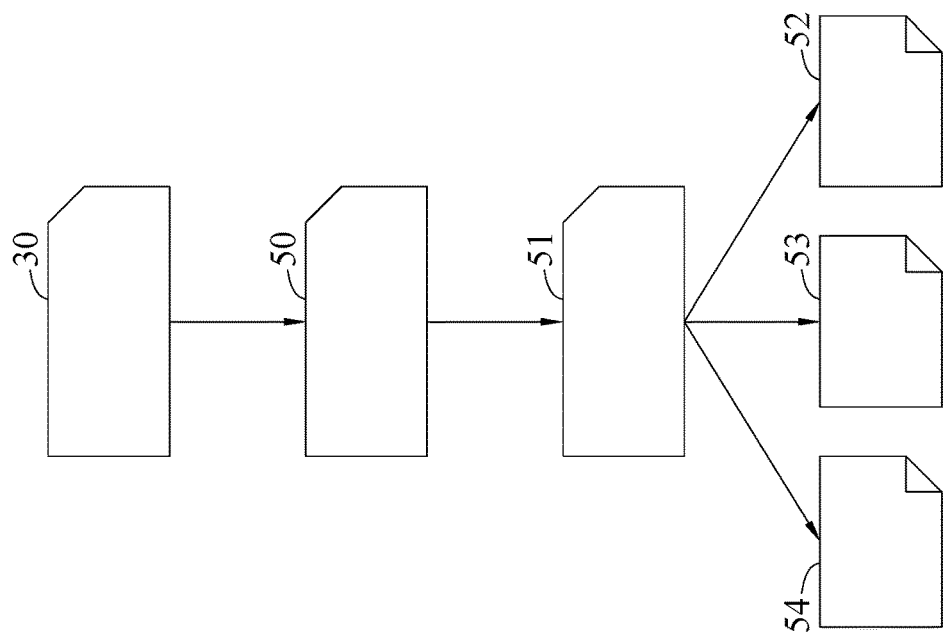
Figures 1, 8:
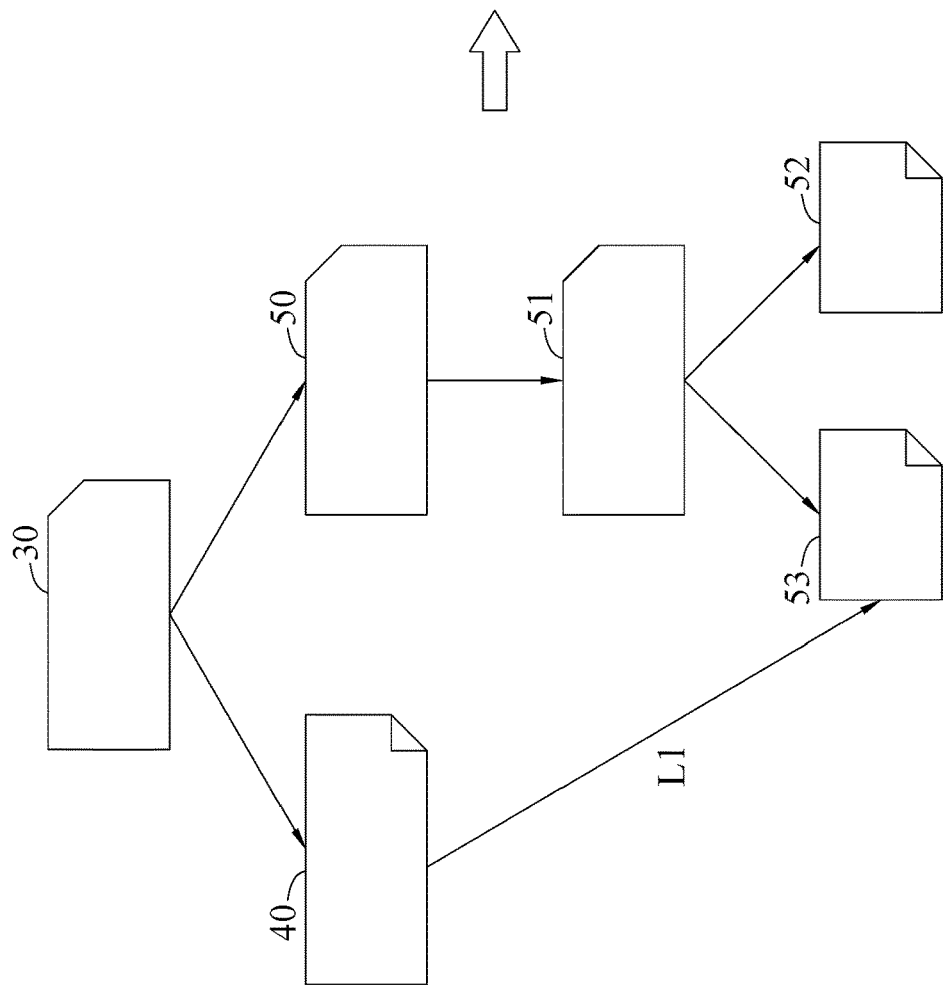

Next, please refer to FIGS. 8-1 and 8-2. First, as shown in FIG. 8-1, the file 40 has two versions 52 and 53, and the link L1 points from the file 40 of the first file path to the latest version 53. When the terminal device 10 sends a request for deleting the file 40 itself to the storage device 20, as shown in FIG. 8-2, in response to the request, the file system 25 deletes the file 40 of the first file path, and generates a version information file 54 at the next level under the folder 51, wherein the version information file 54 records that the file 40 has been deleted.

Figure 9:
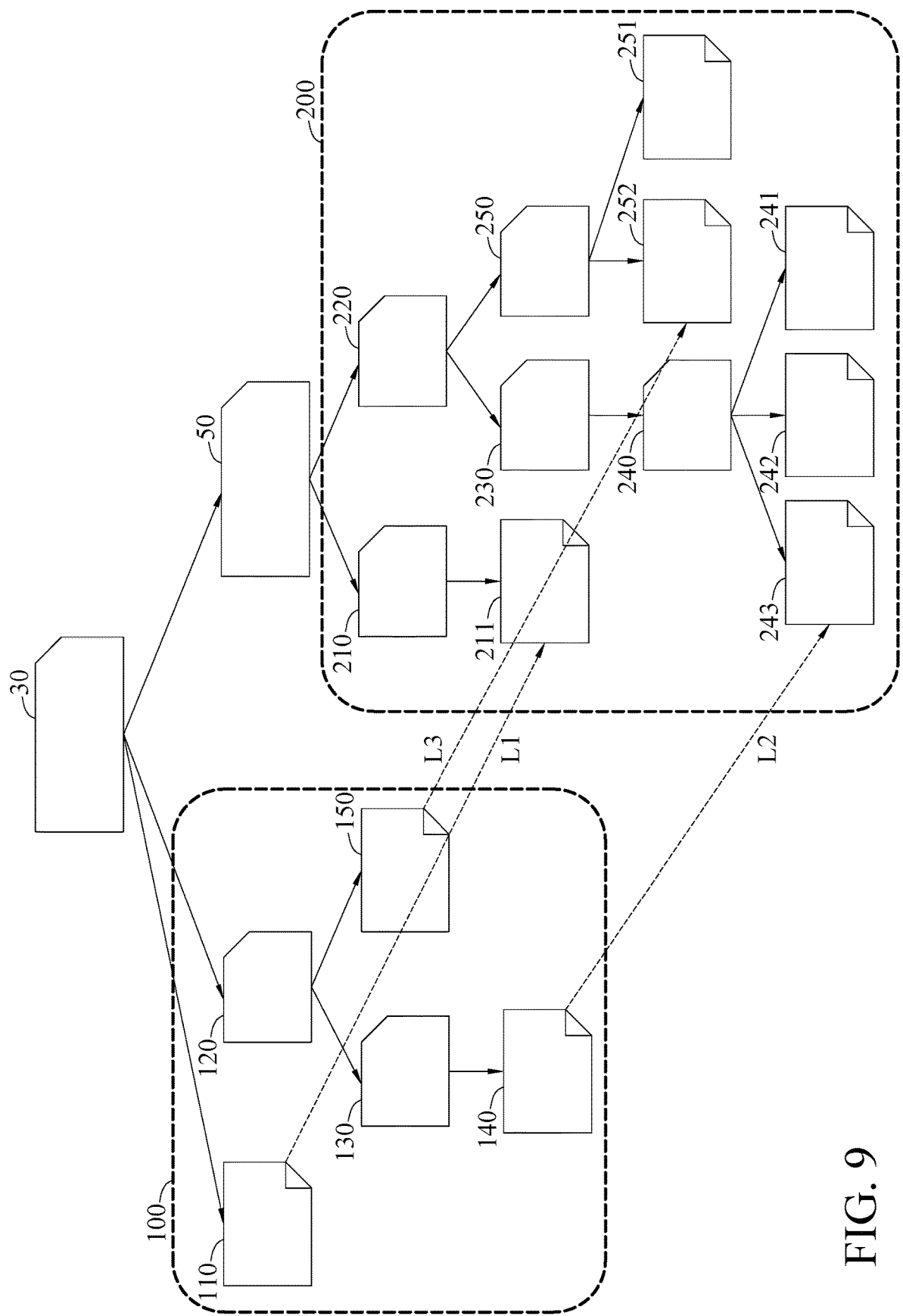
FIG. 9 is a structural diagram of a file system according to an embodiment of the present disclosure.

Next, please refer to FIG. 9, which is a file system structure diagram according to an embodiment of the present disclosure. The folder 30 and the versioning folder 50 in FIG. 9 are the same as their counterparts in the previous embodiments. The file system 25 in this embodiment includes file system structures 100 and 200. The file system structures 100 and 200 are under the folder 30 and the versioning folder 50, respectively. The file system structure 100 is the structure presented to the user by the file system 25, i.e., the file system structure that the user knows, while the file system structure 200 is the structure actually used for versioning management of the files in the file system structure 100.

The file system structure 100 includes the files 110, 140, 150 and the folders 120, 130. The folder 130 and the file 150 are at the next level under folder 120. The file 140 is at the next level under the folder 130. The file system structure 200 includes the files 211, 241-243, 251-252 and the folders 210, 220, 230, 240, 250. The file 211 is at the next level under the folder 210. The folders 230 and 250 are at the next level under the folder 220. The folder 240 is at the next level under the folder 230. The files 241-243 are at the next level under the folder 240. The files 251-252 are at the next level under the folder 250.

The files 211, 241-243 and 251-252 are the version information files of the files 110, 140 and 150, which are the multiple versions of the files 110, 140 and 150. Among them, the version information files 211, 243 and 252 are respectively the latest versions of the files 110, 140 and 150.

Therefore, the file system 25 creates a link L1 pointing from the file 110 to the version information file 211, a link L2 pointing from the file 140 to the version information file 243, and a link L3 pointing from the file 150 to the version information file 252. The creating process of the file system structures 100 and 200 can be deduced from the processes shown in FIG. 2 to FIG. 7-2. In addition, the deletion process shown in FIGS. 8-1 and 8-2 can also be performed in the file system structures 100 and 200.

The following Table 1 is a comparison table of the first file paths of the files 110, 140 and 150 in the file system structure 100 and the second file paths of those files in the file system structure 200. The first file paths are the paths where the files 110, 140 and 150 themselves are located, while the second file paths are the path where the version information files of those files are located. As mentioned in the foregoing embodiments, each of the first file paths may include the folder 30 and higher-level parent folders, while each of the second file paths may include the versioning folder 50, the folder 30 and higher-level parent folders. Table 1 only includes the parts of the first file paths in the file system structure 100 and the parts of the second file paths in the file system structure 200.

TABLE 1

| The first file paths | | The second file paths | |
| --- | --- | --- | --- |
| Reference numerals | Names of folders and files | Reference numerals | Names of folders |
| 110 | F1 | 210 | :F1 |
| 120->130->140 | D1/:D2/F2 | 220->230->240 | D1/\\:D2/:F2 |
| 120->130->140 | D1/\\D2/F2 | 220->230->240 | D1/\\\\D2/:F2 |
| 120->150 | D1/F3 | 220->250 | D1/:F3 |

For each of the files 110, 140 and 150, the name of each folder in the second file path is generated by encoding the name of the corresponding folder or file in the first file path of the same file. As shown in Table 1, for the file 110, its file name "F1" in the first file path is encoded to generate the folder name ":F1" in the second file path. For the file 140, the names "D1", ":D2" and "F2" of the folders and the file in the first file path are encoded to generate the names "D1", "\\:D2" and ":F2" of the folders in the second file path. Alternatively, in another embodiment, the names "D1", "\\D2" and "F2" of the folders and the file in the first file path of the file 140 are encoded to generate the names "D1", "\\\\D2" and ":F2" of the folders in the second file path. For the file 150, the names "D1" and "F3" of the folder and the file in the first file path are encoded to generate the names "D1" and ":F3" of the folders in the second file path.

The encoding rule of the file names in the first file path is the same as that in the previous embodiments. For example, a preset prefix may be attached to the beginning of the file name. For example, the character ":" may be used as the prefix to respectively encode the names "F1", "F2" and "F3" of the files 110, 140 and 150 to generate the names ":F1", ":F2" and ":F3" of the corresponding folders 210, 240 and 250.

The encoding rule for each folder name in the first file path may be attaching the prefix "\\" to the beginning of the folder name if the folder name begins with a specific character or some specific characters (e.g., ":" or "\\"), such as encoding the name ":D2" of the folder 130 into the name "\\:D2" of the corresponding folder 230, or encoding the name "\\D2" of the folder 130 into the name "\\\\D2" of the corresponding folder 230. In addition, if a folder name in the first file path does not begin with the specific character(s), the folder name is not changed. For example, the names of the folder 120 and the folder 220 are both "D1".

The terminal device 10 may send a request for displaying file versions to the storage device 20, such as a request for displaying all versions of a single specified file (for example, the file 110, 140 or 150), or a request for displaying all versions of all files. When the storage device 20 receives a request for displaying all versions of the file 140, in response to the request, the file system 25 transmits the name or the number of each version information file under the folder 240 and some or all of the metadata (such as size and creation time) of each version information file under the folder 240 back to the terminal device 10 to be displayed in the user interface of the terminal device 10.

When the storage device 20 receives a request for displaying all versions of all files, in response to the request, the file system 25 transmits the name or the number of each version information file in the tree structure under the versioning folder 50 (for example, the version information files 211, 241-243 and 251-252 in FIG. 9) and some or all of the metadata of each version information file in the tree structure under the versioning folder 50 back to the terminal device 10 to be displayed in the user interface of the terminal device 10.

When processing a request for displaying the versions of one or more files, the file system 25 may decode the name of each folder in a second file path to obtain the names of the corresponding folders and the corresponding file in the first file path. The decoding here corresponds to the aforementioned encoding.

In detail, if the prefix of the name of the folder at the lowest level in the second file path is the character ":", the name of the corresponding file in the first file path may be obtained by removing the prefix. For example, the names ":F1", ":F2" and ":F3" of the lowest folders 210, 240 and 250 may be respectively decoded into the names "F1", "F2" and "F3" of the corresponding files 110, 140 and 150. If the prefix of the name of a remaining folder in the second file path is "\\:" or "\\\\", the name of the corresponding folder in the first file path may be obtained by removing the "\\" in the prefix. For example, the name "\\:D2" or "\\\\D2" of the folder 230 may be decoded into the name ":D2" or "\\D2" of the corresponding folder 130.

In addition, the file system 25 may further transmit the names of the folders and the file in the first file path obtained by decoding back to the terminal device 10 to be displayed in the user interface of the terminal device 10.

In addition, when processing a request for displaying versions of one or more files, the file system 25 may detect the latest version and/or the version information file that records the information that the file has been deleted among the version information files of each file, and then attach special marks to these version information files in the information transmitted back to the terminal device 10 in response to the request so that the user interface of the terminal device 10 can display the latest version of each file and/or whether each file has been deleted.

For example, among the multiple version information files of a file, the one that shares the inode with the file is the latest version of the file. Alternatively, among the multiple version information files of a file, the one with the latest creation time is the latest version of the file.

For another example, in order to record the information that a file has been deleted in its version information file, the file system 25 may write a default string (such as "Delete-Marker") into the metadata of the version information file.

For example, the default string may be written into the extended attributes in the metadata. Alternatively, the file system 25 may attach a default string (such as "-delete-marker") to the end of the name of the version information file as a suffix to record the information that the file has been deleted in the version information file.

Therefore, when processing a request for displaying the versions of one or more files, the file system 25 can detect whether there is the above-mentioned default string in the metadata of each version information file or at the end of the name of each version information file. Each version information file with the default string records that its corresponding file has been deleted.

In another embodiment, the file system 25 may not create the versioning folder 50. In the embodiments shown in FIGS. 3 to 8-2, the file system 25 may skip the versioning folder 50 and create the folder 51 directly at the next level under the folder 30, which is at the same level as that of the file 40, so the second file path does not include the versioning folder 50. In the embodiment of FIG. 9, the file system 25 may create the folders 210 and 220 directly at the next level under the folder 30, which are at the same level as that of the file 110 and the folder 120. In this embodiment, when the storage device 20 receives a request for displaying all versions of all files, in response to the request, the file system 25 transmits the name or the number of each version information file in the tree structure under the folder 30 and some or all of the metadata of each version information file in the tree structure under the folder 30 back to the terminal device 10 to be displayed in the user interface of the terminal device 10.

In summary, the present disclosure utilizes the links in some file systems in combination with the encoding and decoding of file paths to achieve the purpose of multi-version file management. Since creating a link in a file system costs very little resources in a system, the present disclosure can provide file versioning management based on the links and the encoding and decoding of file paths, and meanwhile maintains the original access performance of the file system without affecting its access performance.

In addition, the present disclosure stores all version information files of all files together under the same folder, for example, under folder 30 or the versioning folder 50. When it is necessary to display all versions of all files, only the files under that folder need to be processed, without the need to compare additional file names and versions in multiple scattered folders in the tree structure, so the effect of high-speed processing can be achieved.

While some of the embodiments of the present disclosure have been described in detail above, it is, however, possible for those of ordinary skill in the art to make various modifications and changes to the particular embodiments shown without substantially departing from the teaching and advantages of the present disclosure. Such modifications and changes are encompassed in the spirit and scope of the present disclosure as set forth in the appended claims.

The invention claimed is:

1. A file versioning management method executed on a processor for a file system installed in a storage device, a computer or a server, the file versioning management method comprising:
   writing a file into a first file path, wherein the first file path comprises a first folder;
   generating a second file path according to the first file path, wherein the second file path comprises a second folder, and the second folder is at least one level under the first folder;

creating a first link pointing from the file of the first file path to a next level under the second folder to generate a first version information file at the next level under the second folder and make the first link point from the file to the first version information file;

writing the file into a first temporary file;

moving the first temporary file to overwrite the file of the first file path; and creating a second link pointing from the file of the first file path to the next level under the second folder to generate a second version information file at the next level under the second folder and make the second link point from the file to the second version information file.

2. The file versioning management method according to claim 1, further comprising:

writing the file into a second temporary file;

moving the second temporary file to overwrite the file of the first file path; and creating a third link pointing from the file of the first file path to the next level under the second folder to generate a third version information file at the next level under the second folder and make the third link point from the file to the third version information file.

3. The file versioning management method according to claim 1, further comprising:

deleting the second version information file; and creating a third link pointing from the file of the first file path to the first version information file.

4. The file versioning management method according to claim 1, further comprising:

deleting the file of the first file path; and generating a third version information file at the next level of the second folder, wherein the third version information file records that the file has been deleted.

5. The file versioning management method according to claim 1, wherein a name of the second folder is generated by encoding a name of the file.

6. The file versioning management method according to claim 1, wherein a name of each folder in the second file path is generated by encoding a name of a corresponding folder or a corresponding file in the first file path.

7. The file versioning management method according to claim 1, further comprising:

setting the file and the second version information file to an immutable state by writing settings of an object lock into metadata of the second version information file, wherein the second link is a symbolic link.

8. The file versioning management method according to claim 1, further comprising:

setting the file and the second version information file to an immutable state by setting an immutable flag of the second version information file, wherein the second link is a symbolic link.

9. The file versioning management method according to claim 1, wherein the second link is a hard link so that the file and the second version information file share an inode.

10. The file versioning management method according to claim 1, wherein all version information files of a plurality of files comprising the file of the first file path are stored together under a third folder, and the third folder being under the first folder.

11. A file system, applied to a storage device, a computer or a server, wherein a processor reads a file uploaded by a terminal device of a user through a wired or wireless network to perform operations in the file system, the operations comprising:

writing the file into a first file path, wherein the first file path comprises a first folder;

generating a second file path according to the first file path, wherein the second file path comprises a second folder, and the second folder is at least one level under the first folder;

creating a first link pointing from the file of the first file path to a next level under the second folder to generate a first version information file at the next level under the second folder and making the first link point from the file to the first version information file;

writing the file into a first temporary file;

moving the first temporary file to overwrite the file of the first file path; and creating a second link pointing from the file of the first file path to the next level under the second folder to generate a second version information file at the next level under the second folder and make the second link point from the file to the second version information file.

* * * * *